(12) United States Patent
Hartley

(10) Patent No.: US 7,451,853 B2
(45) Date of Patent: Nov. 18, 2008

(54) VEHICLE WITH ELEVATED COCKPIT

(76) Inventor: Gary Hartley, 5309 Bowling Green Dr., Ft. Pierce, FL (US) 34951

( * ) Notice: Subject to any disclaimer, the term of this patent is extended or adjusted under 35 U.S.C. 154(b) by 347 days.

(21) Appl. No.: 11/339,149

(22) Filed: Jan. 24, 2006

(65) Prior Publication Data

US 2007/0169983 A1    Jul. 26, 2007

(51) Int. Cl.
*B62D 1/24* (2006.01)
(52) U.S. Cl. ....................................................... 180/320
(58) Field of Classification Search ................. 180/320, 180/318, 323; 296/190.1, 182
See application file for complete search history.

(56) References Cited

U.S. PATENT DOCUMENTS

| 1,681,319 | A | * | 8/1928 | Bartlett ........................ 180/321 |
| D174,727 | S | | 5/1955 | Williams |
| D190,854 | S | | 7/1961 | Prichard |
| D205,836 | S | | 9/1966 | Commons |
| D205,837 | S | | 9/1966 | Commons |
| 3,971,455 | A | * | 7/1976 | Molzon ....................... 180/89.1 |
| 4,417,634 | A | | 11/1983 | Quaeck et al. |
| 4,696,374 | A | * | 9/1987 | Hale ........................... 182/127 |
| 5,011,363 | A | * | 4/1991 | Conley et al. ................ 414/666 |
| 5,297,844 | A | * | 3/1994 | Haustein .................. 296/190.04 |
| 5,331,794 | A | * | 7/1994 | Reichle ........................ 56/17.4 |
| 6,105,721 | A | * | 8/2000 | Haynes ........................ 182/127 |
| 6,550,575 | B2 | * | 4/2003 | Spencer et al. .............. 182/63.1 |
| 6,604,606 | B1 | * | 8/2003 | McDougal et al. ........... 182/127 |
| 7,389,854 | B1 | * | 6/2008 | Johnson et al. .............. 182/127 |
| 2006/0045687 | A1 | * | 3/2006 | Finley .......................... 414/462 |
| 2006/0243187 | A1 | * | 11/2006 | Barstow et al. .............. 114/315 |
| 2006/0273623 | A1 | * | 12/2006 | Romano ...................... 296/178 |
| 2006/0273624 | A1 | * | 12/2006 | Romano ...................... 296/178 |
| 2007/0089929 | A1 | * | 4/2007 | Schriewer .................... 182/127 |

* cited by examiner

*Primary Examiner*—Faye M. Fleming
(74) *Attorney, Agent, or Firm*—McHale & Slavin, P.A.

(57) ABSTRACT

A security vehicle having a main frame suspended on four wheels. A first support deck positioned on said main frame. The wheels at one end of the main frame being driven and wheels at the front end of the main frame being steerable. A drive train is mounted on said main frame and connected to the driven wheels. The drive train is located along a central longitudinal axis of the frame and at the center of the length of the distance between a front and a rear axle. A platform is mounted to the main frame at a level substantially above the first deck and connected to the first deck. Two seats are mounted on the platform. Vehicle controls are mounted on the platform adjacent the seats. Stairs are mounted to the first deck and the platform to allow access to the platform.

5 Claims, 3 Drawing Sheets

VEHICLE WITH ELEVATED COCKPIT

FIELD OF THE INVENTION

The present invention relates generally to vehicles wherein the operator and vehicle controls are located remotely from and substantially above their normal location. Specialized vehicles which are not intended to be operated on streets or public roads do not have to meet government mandated standards for motorized vehicles.

BACKGROUND OF THE INVENTION

Vehicles employed for security purposes normally are commercially available vehicles such as automobiles, sport utility vehicles, or trucks. In special situations motorcycles or bicycles are utilized. When these vehicles are used for security purposes in parking lots or similar areas one of the problems which is encountered is the area which can be readily viewed by the operator. Normally the operator's vision or line of sight is at the same height or lower than a person standing on the ground. This limits the area that the operator can observe at any given time. The larger sport utility vehicles, while offering some increase in height, do not significantly raise the level of the operator's vision to substantially increased the area under observation.

DESCRIPTION OF THE PRIOR ART

There are a number of vehicles available which locate the operator substantially above the level of the ground.

U.S. Pat. No. 4,417,634, discloses an elevated transport vehicle which has its frame carried by steerable bogies and by drive wheels on an axle assembly having a mechanical drive via a telescopic drive shaft from an engine and transmission mounted on the frame. The operator is located in a cab above the engine. The engine is located above the drive wheels. Although the operator has gained a height advantage for vision purposes, the vehicle is very large and can not be maneuvered in conventional parking lots. The location of the engine raises the center of gravity of the vehicle which will present stability problems.

U.S. Design Pat. Nos. D205,836 and D205,837 are for swamp buggies. These vehicles are designed to traverse swamps and areas with soft soil or mud. The operator is located in a cab which is substantially above the ground level. Once again, although the operator has gained a height advantage for vision purposes, the vehicles are large and not easily maneuvered in parking lots.

U.S. Design Pat. No. D190,854 is for a truck with an elevated operator cab. While the operator is located substantially above the ground level, it is not clear how the truck is controlled or where the engine is located. The apparent size of the truck makes it impractical for use as a security vehicle in a parking lot.

U.S. Design Pat. No. D174,727 is for a taxi cab. The driver of the cab appears to sit at an elevated position in the vehicle. It is not clear from the patent how much of a height advantage is gained by this elevated position.

While these vehicles may elevate the position of the driver and passenger, they fail to maintain the drive train, engine and transmission, at a conventional elevation with respect to the ground in order to maintain the vehicle's stability and maneuverability. The increase in height above the ground of the driver, passenger, and vehicle drive train results in a very unstable vehicle. Further, when the vehicle is moving and the driver desires the change the direction in which the vehicle is traveling this higher center of gravity increases the instability of the vehicle the faster the vehicle is moving. In addition, the prior art vehicles all have their engines and drive trains positioned over either the front axle or the rear axle. These locations move the center of gravity either substantially forward or rearward. These locations, of the drive train, further add to the instability of the prior art vehicles when the operator attempts to turn the vehicle while it is moving because the center of gravity of the vehicle is located away from the physical center of the vehicle. In the instant invention the driver and passenger's seating positions are raised substantially above their original positions to gain a visual advantage. The increase in height of the operator and passenger results in their being able to see further distances and over close objects. This increase in height would normally result in the center of gravity of the vehicle being substantially changed. The new center of gravity would be substantially higher than the original center of gravity. In order to overcome this problem the instant invention positions the engine and drive train are positioned on the same level, above the ground, as the level of the front and rear axles on the main frame of the vehicle.

To increase the dynamic stability of a vehicle the engine and drive train should be located as close as possible to the physical center of the vehicle. By having the center of gravity midway between the front and rear axles, the vehicle maintains a neutral response to a change in direction of travel of the vehicle. If the center of gravity is located closer to the front or rear axle the vehicle tends to pivot about this center of gravity when the direction of travel changes. As a result the vehicle will over-steer or under-steer depending in which direction the center of gravity is displaced from the center of the vehicle. The instant invention positions the engine and drive train as close as possible to the mid point of the distance between the front and rear axles. This location of the engine and drive train is not normally possible on conventional vehicles because the driver and passengers occupy this location. However, in the instant invention because the driver and passenger are elevated the engine and drive train can be located at the center of the vehicle.

SUMMARY OF THE INVENTION

The present invention is directed to a vehicle which locates the operator a substantially higher position than normal. The remainder of the vehicle is located at its normal operating height. Also, the engine and drive train are located at the center of the vehicle. As a result the operator gains an increase in the area which is viewed because of the increase in height. However, since the height of the remainder of the vehicle is not increased and the drive train is located at the center of the vehicle this does not result in a significant decrease in vehicle stability.

Accordingly, it is an objective of the instant invention to provide a vehicle chassis with an elevated operator's station.

It is a further objective of the instant invention to provide a vehicle with a conventional drive train location, axle location and wheel location.

It is yet another objective of the instant invention to provide a vehicle which is highly maneuverable in parking lots and other areas.

It is a still further objective of the invention to provide a vehicle with conventional operator controls which are familiar to most individuals so that the time required to learn how to operate the vehicle is kept to a minimum.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
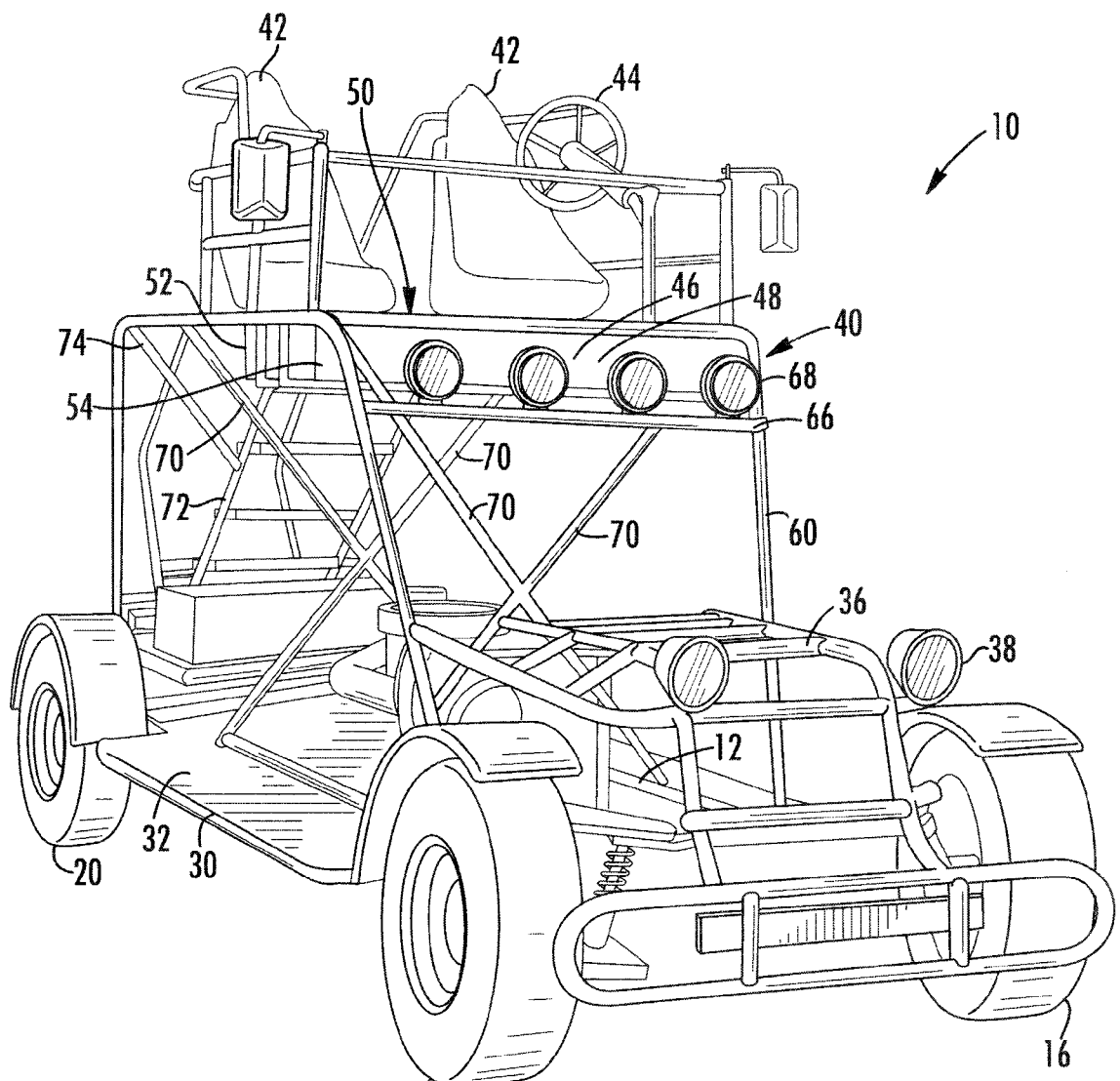
FIG. 1 is a front perspective of the of the vehicle in a preferred embodiment according to the present invention.
Figure 2:
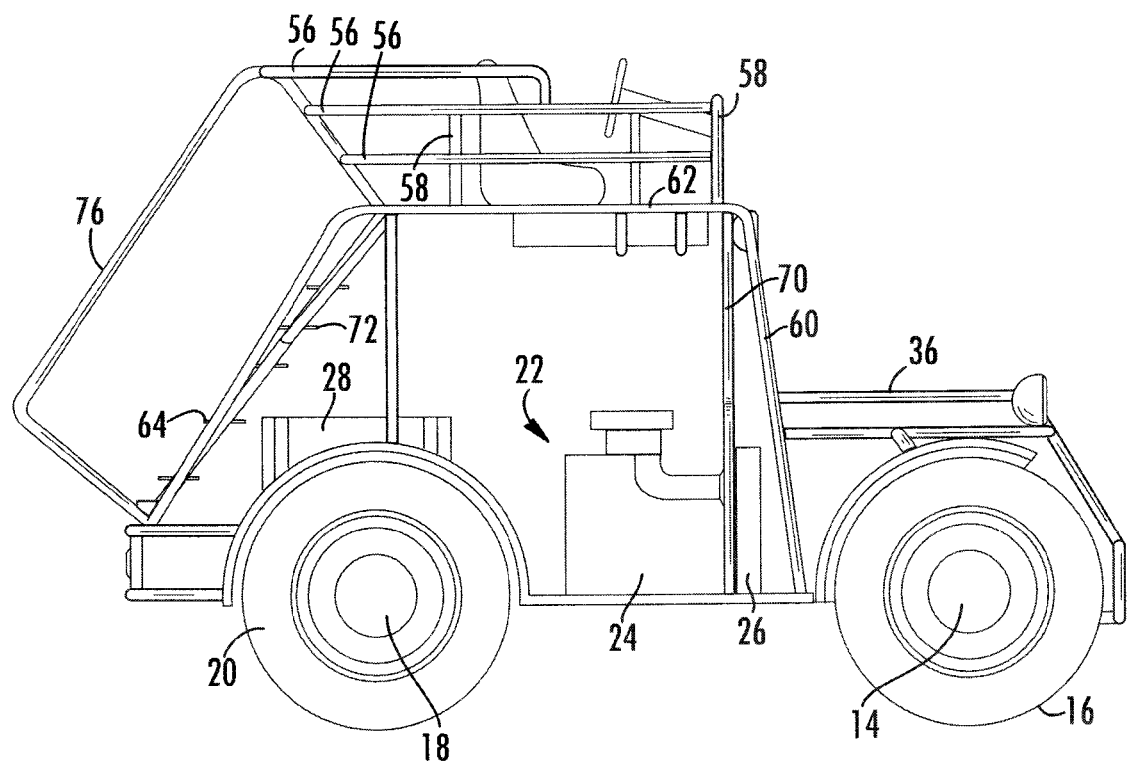
FIG. 2 is a side view of the vehicle according to the present invention.
Figure 3:
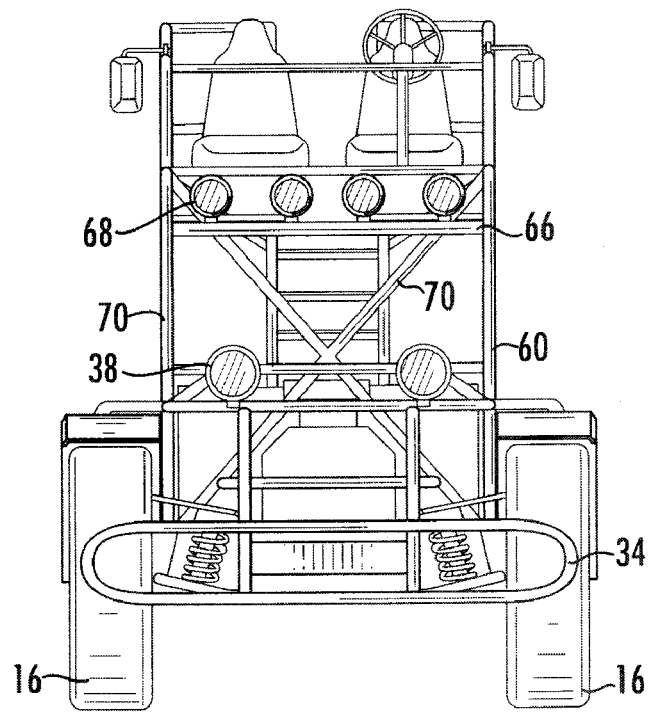
FIG. 3 is a front view of the vehicle according to the present invention.
Figure 4:
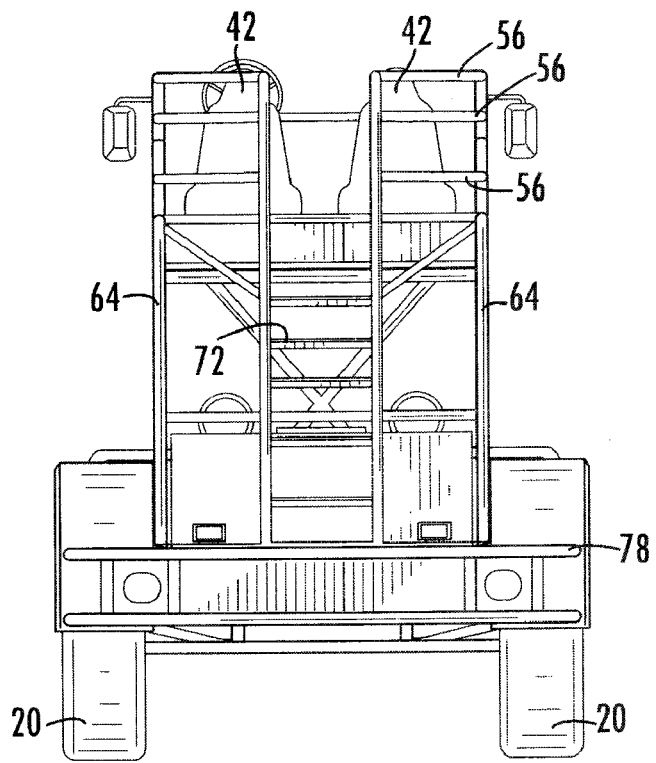
FIG. 4 is a rear view of the vehicle according to the present invention.

While the present invention is susceptible of embodiment in various forms, there is shown in the accompanying drawings and will hereinafter be described a presently preferred embodiment with the understanding that the present disclosure is to be considered an exemplification of the invention and is not intended to limit the invention to the specific embodiments illustrated.

Referring to the accompanying drawings, there is illustrated a vehicle 10 having a frame 12. The vehicle is supported at one end by a front axle 14 onto which two front steerable wheels 16 are mounted. The axle and wheels are mounted on a front portion or end of the frame 12. The vehicle is also supported at the other end by a rear axle 18 onto which two rear drive wheels 20 are mounted. The wheels and axle are mounted on a rear portion or end of the frame 12. The frame is located at the main level or height of the vehicle such that the drive train 22, the front axle and the rear axle are in the same substantially horizontal plane. The two front wheels may also be driven also by a conventional drive assembly.

The frame supports a drive train which consists of an engine 24, transmission, drive shaft and drive axle. The engine and transmission are located in the center portion of the frame, midway between the front and rear axles of the vehicle and at the main level. The transmission is connected to a drive shaft which in turn is connected to the rear drive wheels through a rear drive axle. A radiator 26 is mounted on the vehicle in front of the engine and connected thereto to provide a heat exchanger for the cooling fluid of the engine. Fuel cells or fuel tanks 28 are mounted at a rear portion of the vehicle and spaced from the engine. These are used to hold the fuel for the engine.

The majority of the chassis of the vehicle is formed from tubes or tubular components. These are preferably formed from steel, but other materials may also be employed. A plurality of these tubes or tubular components are joined together to form a horizontal support deck or platform 30 which is attached to the frame and extends outwardly therefrom forward, rearward and on both sides. This deck or platform 30 is at a first elevation or height of the vehicle. The areas in between the tubes are covered by a metal mesh 32 or similar material so that a person or persons may stand on the deck or platform. A plurality of tubes or tubular components are formed into a front bumper 34 which is mounted on the support deck at the foremost position of the vehicle. Another plurality of tubes or tubular components are connected together to form a compartment 36 with an shape similar to that of an "engine compartment" of a typical vehicle. This engine compartment is located on the front portion of the vehicle on the support deck where a typical engine compartment would be located. A plurality of headlights 38 are mounted on the front portion of this engine compartment.

Behind the engine compartment and in the center of the vehicle the engine 24 is mounted onto the frame. A transmission is coupled to the engine and a drive shaft is connected to the output of the transmission. The drive shaft extends rearwardly and is connected to the rear drive axle. Mounted on either end of the rear drive axle 18 are the rear driven wheels 20 which are driven by the rear drive axle. A radiator 26 is mounted on the support deck of the vehicle in front of the engine. While a water cooled engine is illustrated in a preferred embodiment, an air cooled engine could also be utilized.

An elevated platform 40 is positioned centrally of the vehicle and substantially above said vehicle frame at a second elevation or height. The frame of the platform is formed from tubes or tubular components. Sheets of metal or metal mesh are connected to the tubes and form the floor or horizontal surfaces of the platform. The elevated platform is connected to the vehicle utilizing tubes or tubular components which are preferably welded to the vehicle's support deck and frame. The platform is located approximately 5-8 feet above the ground and is provided with seating and vehicle controls for the operator and passenger. As illustrated herein, two seats 42 are mounted on the elevated platform. A steering wheel 44, throttle control 46, brake controls 48 and transmission controls 50 are also mounted onto the platform adjacent the operator's seat. This operating position affords the vehicle operator and passenger a "birds eye" view of the area surrounding the vehicle. This view is substantially greater than the viewing area available from the operating level of a conventional vehicle or a SUV or a truck. This greater viewing area would enable security personnel to patrol a larger area in a given amount of time. Also, they are able to see around and behind vehicles where someone may be hiding.

A metal sheet or other member which spans the space between the tubes which form the perimeter of the platform. This metal sheet forms the floor of the elevated platform. Two seats 42 are mounted on this floor. The area 52 of the platform in front of the seats is located at a slightly lower level then the main area of the platform. This enables the operator and passenger to place their legs and feet at a comfortable and relatively normal position during operation of the vehicle. At the front, rear and both sides of this lower area vertical walls 54 extend upwardly from the lower platform level to the main platform level. These walls also provide areas to which the steering wheel, throttle, brake controls, instruments, communication devices, etc. may be mounted.

Extending along both sides of the platform and behind each seat are a plurality of horizontally positioned, vertically spaced tubes 56. Connecting these tubes to each other and to the platform are a plurality of vertically oriented tubes 58. Together these horizontal and vertical tubes form a fence or restraint to prevent to operator and/or passenger from falling off of the platform.

The elevated platform is retained in its elevated position by a plurality of supports which extend along the perimeter of the platform. These supports are formed from tubes or tubular components. The main supports extend along the sides of the platform and comprise three tubes each. The first tube 60 of each support is substantially vertically oriented and extends upwardly from the vehicle main level to the elevated platform level. This tube is located in the front of the vehicle forward of the platform and rearwardly of the portion of the tubes which form the "engine compartment". The second tube 62 of each support is horizontally disposed and positioned at the same level as that of the elevated platform. This second tube 62 extends from the first tube 60 rearwardly to a location rearward of the platform. In a preferred embodiment a curved tube joins the first and the second tubes. The third tube 64 of each support extends downwardly and at an angle from the rear end of the second tube 62 to the rear portion of the main level of the vehicle. In front of the platform a horizontally oriented tubular member 66 may be attached to the upper portion of both of the first tubes. A plurality of lights 68 are mounted on this horizontal member. Additional support for the platform are provided by tubes or tubular members 70 which form X-shaped bracing at the front and rear of the platform. The bracing extends from the platform down to the main level of the vehicle. Attached to the rear of the platform is a set of steps 72. The steps extend upwardly from the vehicle main level to the platform and allow the driver and passenger access to the platform. There are also bracing members 74 attaching the steps to the platform supports. A plurality of handrails 76, formed from tubular components extend along each side of the steps from the vehicle frame up to the platform. The handrails are vertically spaced from the steps a distance such that a person walking up the steps could comfortably hold onto the handrails. A rear bumper 78 is formed from tubular members and attached to the rear of the frame 12.

A steering wheel and steering column are attached to the elevated platform at a forward portion thereof. The steering column extends from the elevated platform downward to a conventional steering mechanism at the front portion of the main level of the vehicle. The steering mechanism is in turn connected to the steerable wheels. A throttle pedal is positioned at the forward end of the platform below the steering wheel. The throttle pedal is connected to the engine via a cable. A brake pedal is positioned adjacent the throttle pedal and activates the vehicle brakes through a conventional brake activation means. A transmission control lever is positioned adjacent the side of the operator's seat. It is connected to the transmission via a cable system. The transmission control lever may be positioned at other locations as long as the lever is accessible to the operator.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A self-propelled security vehicle comprising:
   a main frame having a central longitudinal axis;
   a first support deck positioned essentially juxtaposed in relation to said main frame;
   wheels journaled on axles at opposite ends of said main frame and spaced on opposite sides of said central longitudinal axis, at least the spaced wheels at one end of said main frame being driven, the spaced wheels at the front end of said main frame being steerable;
   a drive train mounted on said main frame and connected to said driven wheels, said drive train and said axles are in essentially coplanar relationship;
   said drive train is located along said central longitudinal axis and at the center of the length of the distance between a front and a rear axle means;
   a platform mounted to said main frame at a level substantially above said first deck and connected to said first deck;
   means for mounting said platform to said main frame and said first deck comprise tubular support members, at least one of said means for mounting comprises a first vertically oriented tubular member connected to said first deck and extending upwardly to said platform, a second horizontally oriented tubular member connected to said first tubular member at one end and to said platform, a third tubular member connected to the other end of said second tubular member at one end and extending downwardly from said second tubular member and also connected to said first deck at the other end thereof;
   at least one seat mounted on said platform;
   vehicle controls mounted on said platform adjacent said at least one seat and constructed and arranged to communicate with said drive train and said steerable wheels; and
   means mounted to said first deck and said platform to allow at least a driver access to said platform.

2. The self-propelled security vehicle of claim 1 wherein said access means for said platform comprising a plurality of steps extending from said first deck up to said platform.

3. The self-propelled security vehicle of claim 1 wherein said vehicle controls comprise a steering wheel, a throttle control, a brake control and a transmission control.

4. The self-propelled security vehicle of claim 1 wherein said means for mounting said platform to said main frame and said first deck further comprises a plurality of tubular members extending between said platform and said first deck at the front and at the rear of said platform, said tubular members at the front of said platform extend downwardly at an angle with respect to each other so as to form an "X" shape, and said tubular members at the rear of said platform extend downwardly at an angle with respect to each other so as to form an "X" shape.

5. The self-propelled security vehicle of claim 1 further comprising said spaced wheels at both ends of said main frame being driven.

* * * * *